UNITED STATES PATENT OFFICE.

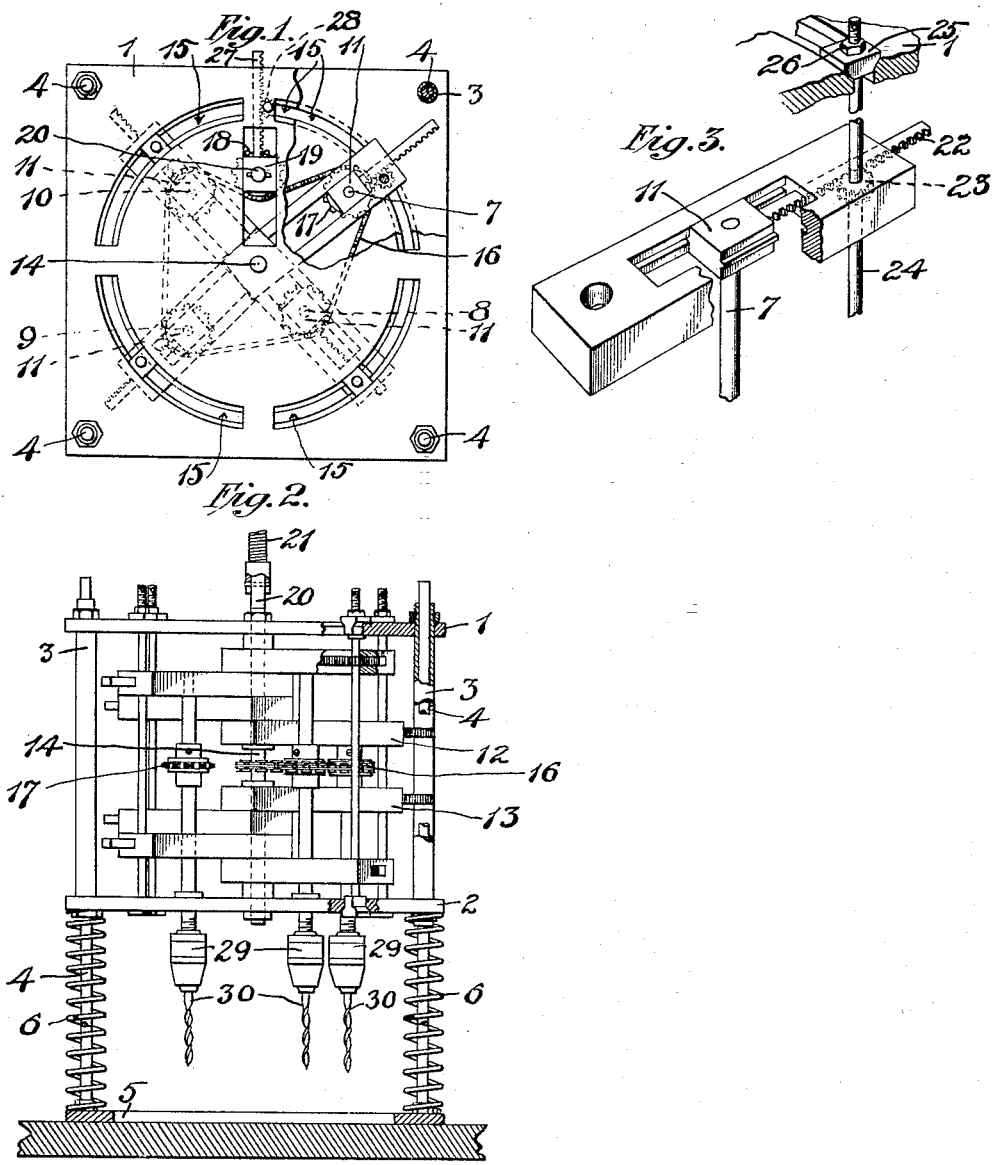

WILLETT H. J. GWYER, OF YONKERS, NEW YORK.

MULTIPLE DRILL.

1,340,953.

Specification of Letters Patent.

Patented May 25, 1920.

Application filed June 19, 1919. Serial No. 305,313.

*To all whom it may concern:*

Be it known that I, WILLETT H. J. GWYER, a citizen of the United States of America, residing at Yonkers, New York, have invented a new and useful Multiple Drill, of which the following is a specification.

My invention relates to drilling machines, the object being to provide in a machine of this type a plurality of drills so arranged that they may all be driven from a single source of power; and also so arranged that the drills may be separately adjusted so that a number of holes may be bored at one time in any desired positions.

In the accompanying drawings:

Figure 1 is a plan view on a reduced scale of my invention, certain parts being broken away.

Fig. 2 is a side elevation of the parts shown in Fig. 1, parts being broken away and shown in section.

Fig. 3 is a perspective view of certain details, relatively enlarged.

1 is a top plate. 2 is a bottom plate. 3—3 are tubular rods located at each corner of the plates 1—2 and serving to tie them together to form a frame. 4—4 are posts rigidly mounted on a base 5, said posts projecting into the tubular rods 3—3 so that the frame may slide up and down on the posts 4—4. 6—6 are coil springs which normally serve to hold the frame in the elevated position shown in Fig. 2. In the particular form of the invention shown herein, I have provided four drills, and accordingly, I have provided four rotatable drill spindles 7, 8, 9 and 10. These drill spindles are each mounted in suitable adjustable bearing boxes or bushings 11—11, each drill spindle having two of such bushings, said bushings being respectively mounted to slide in a pair of spaced supporting arms, a tongue and groove guide being provided by preference. A description of one pair of these arms will be sufficient since each pair corresponds in construction and function. The arms which support the drill spindle 7 are indicated at 12 and 13, Fig. 2. These arms 12—13 are mounted at their inner ends upon a central arbor 14 carried by the frame plates 1 and 2. Each arm 12—13 is provided with a longitudinal slot and the bushings carried thereby are mounted to slide in said slots, suitable means being provided to lock these bushings at any desired position of adjustment in the length of said slots. One preferred locking means will be described herein later on.

The frame plates 1 and 2 are provided with arc-shaped slots 15—15 for each pair of drill spindle supporting arms. These arc-shaped slots are located preferably near the outer ends of said arms. Suitable means are provided whereby the aforesaid drill spindle supporting arms may be swung around the center arbor 14 to vary the angular position of the drill spindle, the particular means shown for effecting this adjustment of the drill spindle supporting arms being later described herein.

16 is a driving belt preferably in the form of a sprocket chain which runs around pulleys or sprockets 17 on the drill spindles. 18 is a driving pulley or sprocket for the chain 16, said sprocket being mounted in a suitable bearing or bushing 19 which is slidable radially toward and from the center arbor 14 in a radial slot in the upper and lower plates 1 and 2 whereby slack in the belt or chain may be taken up by shifting the pulley 18 properly. 20 represents the driving shaft upon which the driving spindle 18 is fixed, the said shaft 20 being driven from any suitable source of power by any suitable means, a piece of flexible shafting 21 constituting one suitable means for that purpose.

The spindles 7, 8, 9 and 10 are preferably adjustable radially relatively to the central arbor 14 in the following manner, reference being had to the detailed view, Fig. 3, illustrating only one of said bushings of a set, in which it will be seen that this bushing, indicated by the reference numeral 11, has a toothed rack 22 which projects through a suitable passage in the outer end of the arm 12, the said rack being engaged by a pinion 23 fixed upon shaft 24, whereby when the shaft 24 is turned the bushing 11 and the drill spindle 7 will be moved to or fro. The shaft 24 projects through the slots 15 in the upper and lower plates 1 and 2, and may be locked therein by a friction piece 25 held by a nut 26 on shaft 24. The lower end of the shaft 24 may be rotatably held in a member similar to the friction piece 25. When this friction device 25 is released, it will permit the turning of the shaft 24 for the purpose of adjusting the drill spindle 7 closer to or farther away from the center 14, and will also permit the supporting arms for the same drill spindle to be swung to the desired angular position anywhere within the range of the arc-shaped slot 15. When the drill spindle 7 has been positioned as desired, the nut 26 may be turned down so as to cause the friction device 25 to lock the shaft 24 against movement and thereby lock the drill spindle bushing in the adjusted position. When this process of adjusting all of the drill spindles has been completed and the same are locked in place, the drive sprocket 18 is adjusted, if necessary, to take up any undesirable slack in the sprocket belt or chain 16 and this adjustment may be effected in any desired way and by any desired means, such as a rack 27 and a pinion 28.

With the various parts of the machine adjusted as aforesaid, the piece to be drilled is placed under the machine between the posts 4—4. Pressure is then applied to the spring supported frame to force it downwardly against the tension of the spring 6—6, which descent is continued until the drills complete their work. When the pressure is released the frame will rise due to the compression springs and the drilled piece may then be removed. In the drawings, I have shown the lower end of the drill spindles provided with suitable chucks 29—29 for carrying drills 30—30.

While I have shown my drilling apparatus as equipped with four drill spindles, obviously the number is immaterial. It should also be understood that I may modify the various features of construction described in many ways without departing from the spirit or scope of the invention.

One great advantage of my improvement resides in the fact that the entire machine is easily portable, in which event the motor, for example, could be mounted directly thereon. While I refer to my machine as a drilling machine, obviously screw-driver bits could be substituted for the drill 30—30 so that the machine could be used for driving a plurality of screws, and, therefore, it should be understood that by the term drilling machine I do not necessarily intend to limit the use of the machine to a mere drilling operation, since the machine can be used with drills, screw-driver bits, or any other devices that would be appropriate for use in connection with such apparatus as shown and described herein.

I claim:

1. In a machine of the character described, a frame, a plurality of rotatable spindles mounted therein, means for adjusting said spindles toward and from the center of the frame and angularly around the center of said frame, a driving belt for revolving all of said drill spindles, means for driving said belt and means for adjusting the tension of said belt, said belt adjusting means operating on said belt driving means.

2. In a machine of the character described, a frame comprising two spaced plates, an arbor between said plates and substantially in the middle of the same, a plurality of sets of arms between said plates and mounted on said arbor, to swing, said arms having longitudinal slots therein, said plates having arc-shaped slots therein, rotatable spindles supported by said arms and slidable to and fro in the slots therein, means carried by each set of arms projecting into said arc-shaped slots for locking each set of arms in different positions of angular adjustment relatively to the other sets of arms.

3. In a machine of the character described, a frame comprising two spaced plates, an arbor between said plates and substantially in the middle of the same, a plurality of sets of arms between said plates and mounted on said arbor to swing, said arms having longitudinal slots therein, said plates having arc-shaped slots therein, rotatable spindles supported by said arms and slidable to and fro in the slots therein, means carried by each set of arms projecting into said arc-shaped slots for locking each set of arms in different positions of angular adjustment relatively to the other sets of arms, a pulley on each of said rotatable spindles, a belt passing around said pulleys, a driving pulley carried by said plates and engaging said belt, and means for adjusting the driving pulley to and fro to take up slack in said belt.

4. In a machine of the character described, an upper and lower frame plate, tubular posts connecting the same, stationary supporting posts projecting into said tubular posts with springs on said stationary posts for yieldingly supporting said frame plate, a central arbor between said plates, a plurality of sets of spaced arms mounted on said arbor and between said plates and arranged for relative angular adjustment around said arbor, a plurality of rotatable spindles carried by said spaced arms, said spindles being adjustable radially relatively to said arbor, a pulley or the like on each of said spindles arranged to be driven by a single belt, a driving spindle carried by said plates and movable toward and from the center, a driving pulley carried by said last mentioned spindle for engaging said chain.

WILLETT H. J. GWYER.